(12) United States Patent
Calvert

(10) Patent No.: US 6,663,251 B2
(45) Date of Patent: Dec. 16, 2003

(54) GAUGE WITH ILLUMINATED DIAL AND POINTER

(75) Inventor: Douglas J. Calvert, DeKalb, IL (US)

(73) Assignee: Auto Meter Products, Inc., Sycamore, IL (US)

( * ) Notice: Subject to any disclaimer, the term of this patent is extended or adjusted under 35 U.S.C. 154(b) by 0 days.

(21) Appl. No.: 10/133,519

(22) Filed: Apr. 26, 2002

(65) Prior Publication Data
US 2003/0202335 A1 Oct. 30, 2003

(51) Int. Cl.[7] .............................................. G01D 11/28
(52) U.S. Cl. .............................. 362/23; 362/26; 362/27
(58) Field of Search ............................. 362/23, 26, 27, 362/800; 116/286, 287, 288, 310, DIG. 6, DIG. 36

(56) References Cited

U.S. PATENT DOCUMENTS

| | | | | |
|---|---|---|---|---|
| 2,280,700 A | * | 4/1942 | Hall ........................... | 116/288 |
| 2,916,011 A | * | 12/1959 | Molis ................... | 116/DIG. 36 |
| 4,163,428 A | | 8/1979 | Ishikawa ..................... | 116/288 |
| 4,215,647 A | | 8/1980 | Fukasawa ................... | 116/286 |
| 4,217,625 A | | 8/1980 | Klein ........................... | 362/30 |
| 4,218,726 A | | 8/1980 | Fukasawa et al. ............ | 362/23 |
| 4,274,358 A | | 6/1981 | Nakamura et al. .......... | 116/288 |
| 4,621,306 A | | 11/1986 | Sell .............................. | 362/29 |
| 4,771,368 A | | 9/1988 | Tsukamoto et al. ........... | 362/29 |
| 5,142,456 A | | 8/1992 | Murphy ........................ | 362/26 |
| 5,531,181 A | | 7/1996 | Cookingham ................ | 116/288 |
| 5,546,888 A | * | 8/1996 | Skiver et al. .................. | 362/23 |
| 5,603,283 A | | 2/1997 | Owen .......................... | 116/284 |
| 5,839,811 A | | 11/1998 | Shimura ....................... | 362/30 |
| 5,845,598 A | | 12/1998 | Ross et al. .................... | 116/288 |
| 5,911,492 A | | 6/1999 | Perry et al. ................... | 362/26 |
| 5,915,822 A | | 6/1999 | Ogura et al. .................. | 362/26 |
| 5,934,782 A | | 8/1999 | Atkins et al. ................. | 362/26 |
| 5,983,827 A | | 11/1999 | Cookingham et al. ...... | 116/288 |
| 6,025,820 A | | 2/2000 | Salmon et al. ................ | 345/75 |
| 6,046,583 A | | 4/2000 | Ayres et al. ................. | 324/146 |
| 6,276,809 B1 | | 8/2001 | Matsumoto ................... | 362/26 |
| 6,302,552 B1 | | 10/2001 | Ross et al. .................... | 362/30 |

* cited by examiner

Primary Examiner—Y. Quach
(74) Attorney, Agent, or Firm—Jenkens & Gilchrist

(57) ABSTRACT

A gauge with a light-transmitting dial plate having a front surface with indicia for a variable represented by the dial, at least one light source spaced rearwardly from the rear surface of the dial plate for illuminating the dial plate, and a light-transmitting pointer mounted for rotational movement about an axis normal to the dial plate. The pointer has a hub concentric with the axis, extending through the dial plate and projecting both forwardly and rearwardly from the plate, and an indicator projecting laterally from the hub across a portion of the front surface of the dial plate. The portion of the hub extending rearwardly of the dial plate is shaped to capture light directly from the light source so that light enters the hub and propagates forwardly through the hub, and then laterally from the hub into the indicator to illuminate the indicator.

24 Claims, 4 Drawing Sheets

GAUGE WITH ILLUMINATED DIAL AND POINTER

FIELD OF THE INVENTION

The present invention relates generally to gauges and, more particularly, to gauges having illuminated dials and pointers such as the gauges used in automotive applications for speedometers, fuel gauges and the like.

BACKGROUND OF THE INVENTION

Gauges with illuminated dials and pointers have been made for many years, for a variety of different applications. One of the largest applications for such gauges is the automotive industry where gauges having illuminated dials and pointers are used in large numbers, and have been in use for many years. Much effort has gone into the development of such gauges that can be efficiently and economically manufactured and that are aesthetically pleasing. Numerous patents have been issued on various designs and constructions for such gauges, such as U.S. Pat. Nos. 4,163,428; 4,215,647; 4,218,726; 4,274,358; 4,771,368; 5,839,811; 5,915,822; 5,934,782 and 6,276,809;.

SUMMARY OF THE INVENTION

It is one object of the present invention to provide an improved design for a gauge having an illuminated dial and pointer, that can be efficiently manufactured at a relatively low cost because of the simplicity of the construction, and yet still provides good illumination of the dial and pointer and is aesthetically pleasing. In this connection, a one specific object of this invention is to provide such an improved gauge that does not require a separate light source for the pointer.

It is a further object of the present invention to provide such an improved gauge that has relatively few parts and can be made small, compact and lightweight.

Another object of the invention is to provide such an improved gauge that illuminates the pointer uniformly regardless of the angular position of the pointer.

A still further object of the present invention to provide such an improved gauge which generates very little heat.

In accordance with the invention, there is therefore provided a gauge comprising a light-transmitting dial plate having a front surface with indicia for a variable represented by the dial, at least one light source spaced rearwardly from the rear surface of the dial plate for illuminating the dial plate, and a light-transmitting pointer mounted for rotational movement about an axis normal to the dial plate. The pointer has a hub concentric with the axis, extending through the dial plate and projecting both forwardly and rearwardly from the plate, and an indicator projecting laterally from the hub across a portion of the front surface of the dial plate. The portion of the hub extending rearwardly of the dial plate is shaped to capture light directly from the light source so that light enters the hub and propagates forwardly through the hub, and then laterally from the hub into the indicator to illuminate the indicator.

BRIEF DESCRIPTION OF THE DRAWINGS

The invention will now be described in connection with a preferred embodiment with reference to the following illustrative figures so that it may be more fully understood. It will be understood that the particulars shown are by way of example and for purposes of illustrative discussion of the preferred embodiment of the present invention only, and are presented to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the. art how the several forms of the invention may be embodied in practice.

In the drawings.

DETAILED DESCRIPTION OF PREFERRED EMBODIMENT

Figure 1:
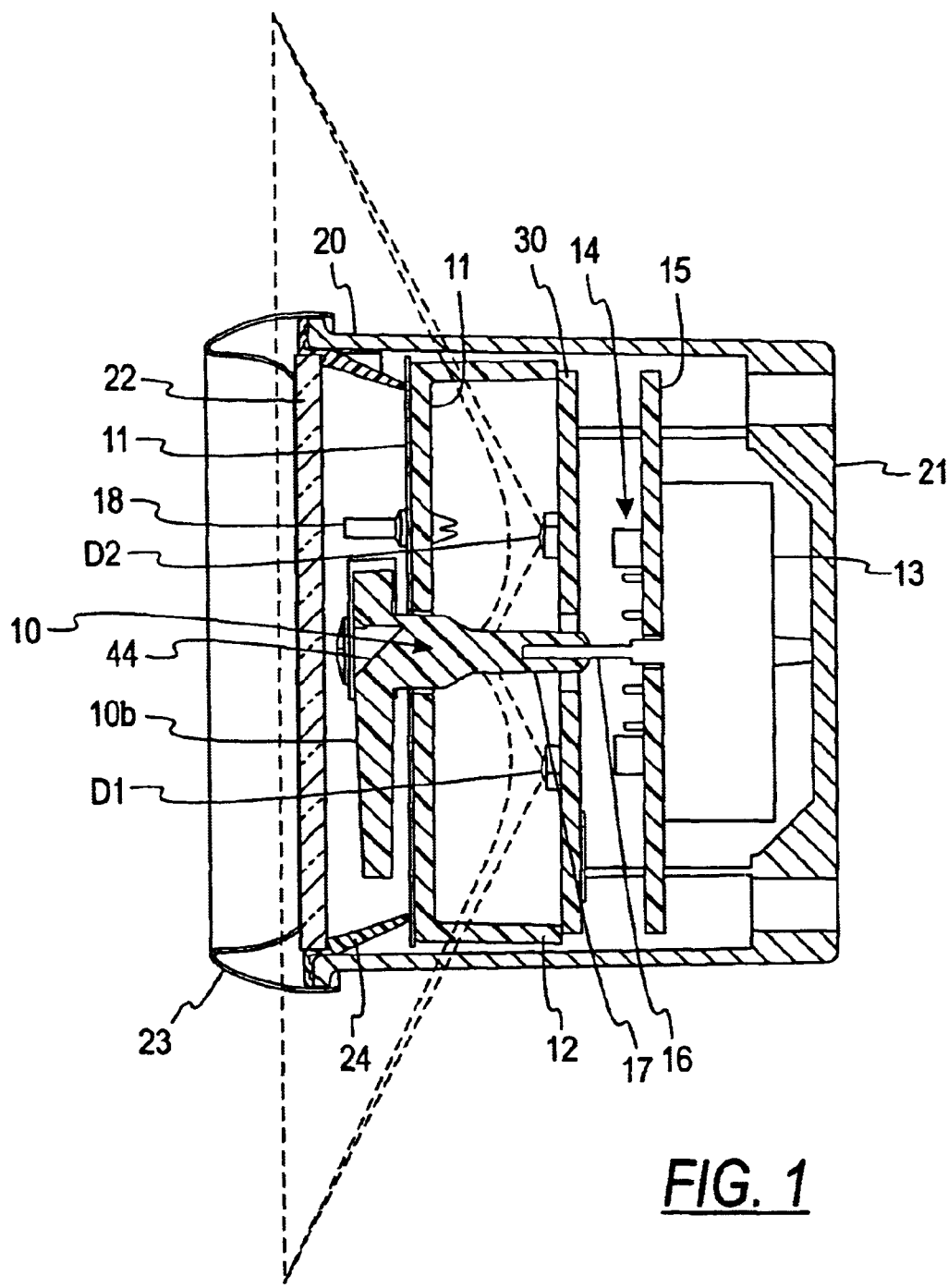
FIG. 1 is a longitudinal cross-sectional view of an automotive gauge including one embodiment of the invention.

Referring now to FIG. 1, there is shown an automotive gauge having a light-transmitting pointer 10 mounted for limited rotational movement across the face of a dial plate 11 formed as the end wall of a cylindrical cup 12 that is open at its inner end. The pointer is mounted to maintain a clearance between the dial face and the rear surface of the pointer, and is driven by a small electric motor 13 controlled by electrical circuitry 14 on a printed circuit board (PCB) 15. The motor 13 has an output shaft 16 that fits into a mating hole in a stem 17 extending rearwardly from the pointer 10 and formed as an integral part of the pointer. A stop pin 18 limits the pivoting movement of the pointer 10 across the dial, for precise positioning of the pointer during automatic re-calibration, as is known in the art.

The entire gauge mechanism and control circuitry is enclosed in a cylindrical housing 20 having a closed back end 21 and an open front end for receiving a lens 22 and a bezel 23 covering the outer peripheries of the lens 22 and the open end of the housing 20. The lens 22 is supported on a retainer ring 24 that rests on the open end of the housing 20 and extends downwardly to the face of the dial plate 11. A sealing ring 25 fits inside the bezel 23 to provide a seal between the bezel and the adjacent surfaces of the housing 20, the lens 22 and the retainer ring 24 to prevent ambient moisture and particulate matter from entering the interior of the gauge.

To illuminate the dial face, the cup 12 that forms the dial plate 11 is made of a light-transmitting material such as a clear plastic and is illuminated by light radiated from three light-emitting diodes ("LEDs") D1–D3 mounted on a second PCB 30. The LEDs D1–D3 are spaced rearwardly from the rear surface of the dial plate 11, and receive electrical power from connectors (not shown) that pass through the printed circuit board 15 to a power connection at the back end of the housing 20. The three LEDs D1–D3 are preferably mounted at 120° intervals around the central axis of the gauge, which is normal to the plane of the dial plate 11 and is also the axis of the pointer stem 17 and the output shaft 16 of the motor 13.

Light from the LEDs D–D3 is picked up by the inside surfaces of the dial-plate cup 12 and propagated throughout that cup so as to illuminate the dial plate 11 that forms the base plate of the dial face. As illustrated by the broken lines in FIG. 1, each of the LEDs D1–D3 is a wide-angle LED with a viewing angle of about 120° to ensure uniform illumination of the dial plate. A thin opaque face plate 31 is attached to the front surface of the illuminated plate 11 to form the desired indicia on the dial face by covering portions of the plate 11 so that only the non-covered portions of the illuminated plate 11 are visible.

In accordance with one aspect of the present invention, the pointer is made of a transparent or translucent material, preferably colored, and is illuminated by the light from the same light source that illuminates the dial face. Thus, in the illustrative embodiment, light from the three LEDs D1–D3 is captured by a tapered, frusto-conical transition 40 on the pointer stem 17, rearwardly of the dial plate 11. This tapered transition 40 is located between a narrow distal portion 41 of the stem 17 and a wide proximal portion 42 that extends forwardly through the dial plate 11. The transition is also located in front of the diodes D1–D3 so that a portion of the light radiating forwardly from the LEDs impinges on the tapered transition 40. Light thus enters the wide portion 42 of the transparent or translucent stem 17 via the tapered transition 40 and propagates forwardly through the wide portion 42 of the stem 17.

The tapered transition 40 is coaxial with the stem 17 and is uniform around the entire circumference of the stem 17, so that the exterior surface of the transition captures substantially the same amount of light regardless of the angular position of the pointer. This arrangement illuminates the pointer without the use of a separate light source dedicated to the pointer, and illuminates the pointer with a brightness that is consistent and non-fluctuating regardless of the angular position of the pointer. The frusto-conical surface of the transition 40 preferably forms an angle between about 20° and about 40° with respect to the axis of the stem 17, and a particularly preferred angle is about 30°. The exterior surface of the transition 40 is preferably a highly polished surface, which may be achieved by molding the pointer from a polymeric material in a mold in which that portion of the mold surface that forms the transition 40 is treated to form a very smooth surface.

Figure 2:
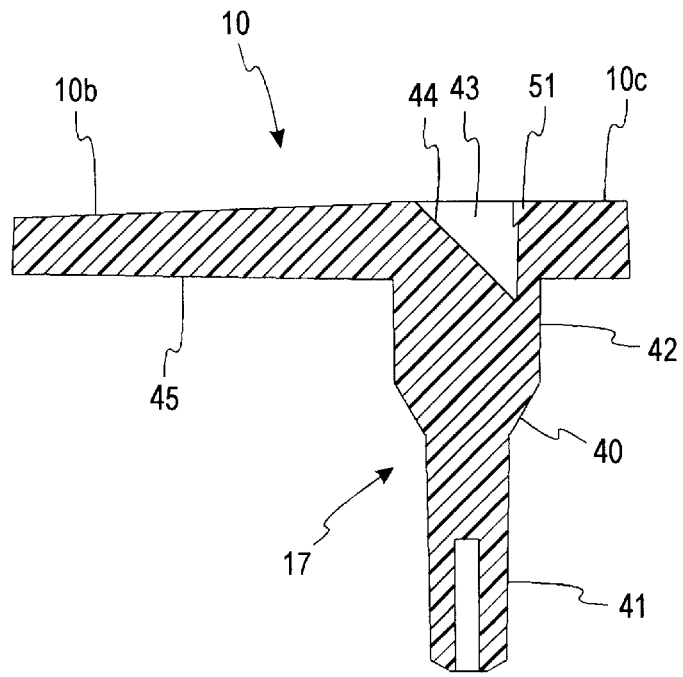
FIG. 2 is an enlarged longitudinal cross-sectional view of the pointer in the gauge of FIG. 1.
Figure 3:
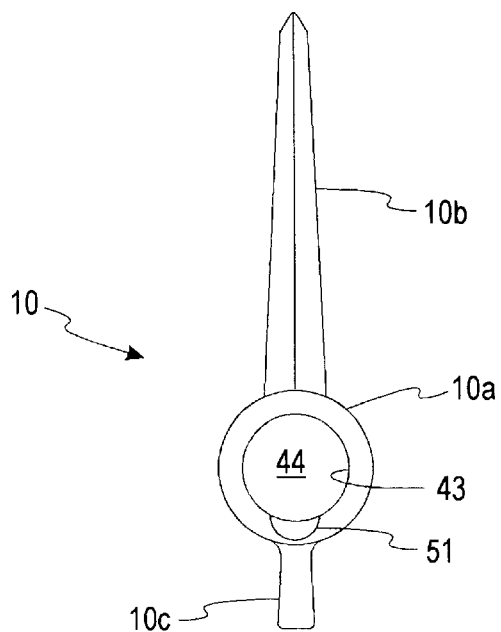
FIG. 3 is a top plan view of the pointer shown in FIG. 2.
Figure 4:
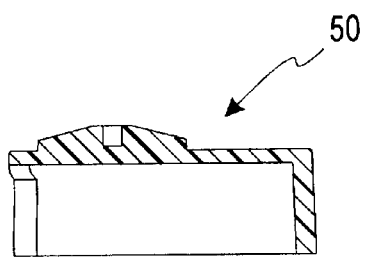
FIG. 4 is a longitudinal cross-sectional view of a cap for the tail portion of the pointer in the gauge of FIG. 1.
Figure 5:
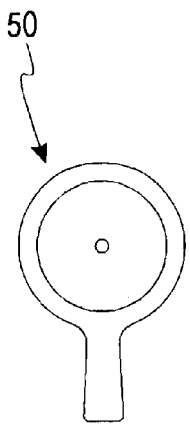
FIG. 5 is a top plan view of the cap shown in FIG. 4.
Figure 6:
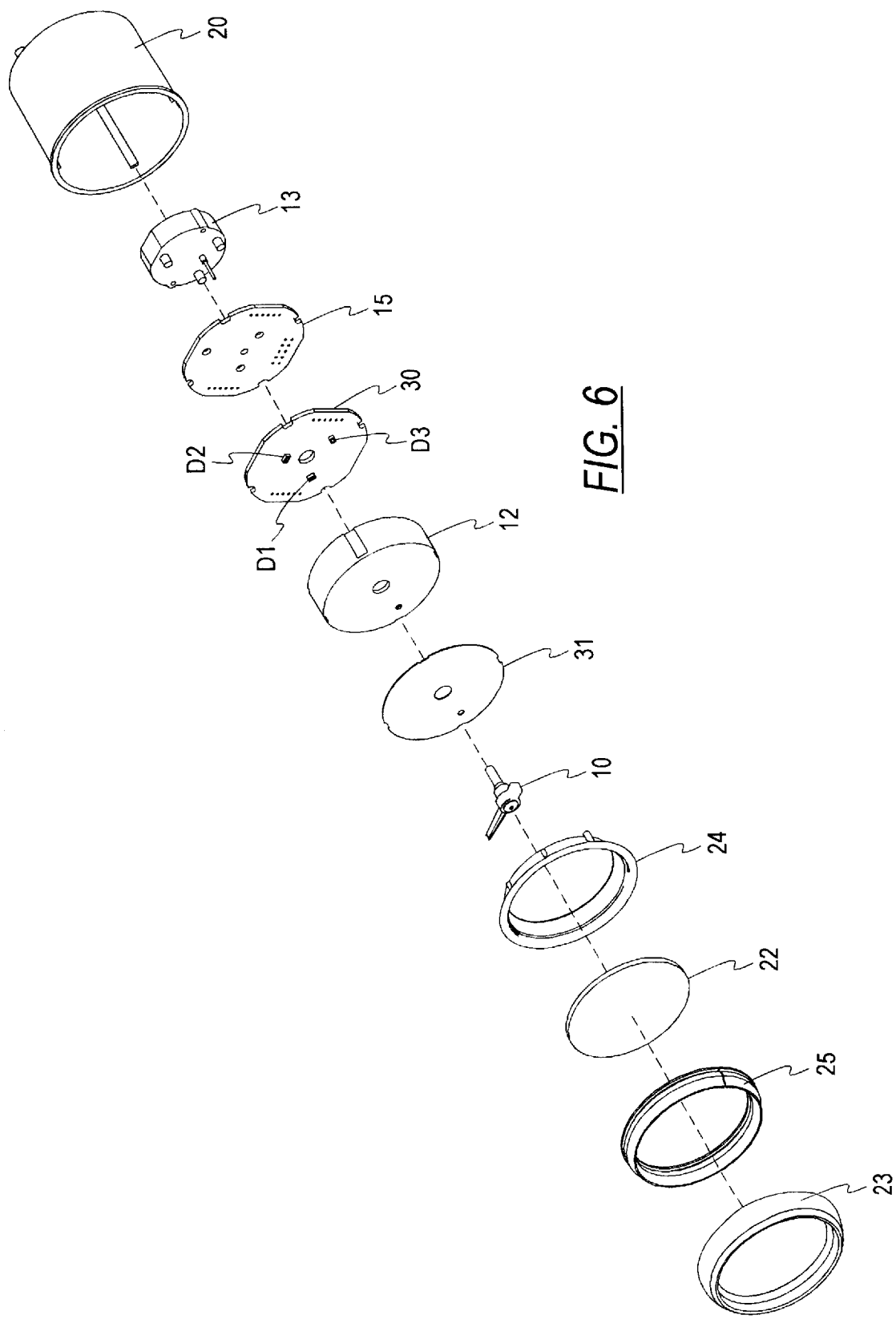
FIG. 6 is an exploded perspective of the gauge of FIG. 1.

To direct the light that propagates forwardly through the stem 17 laterally into the pointer 10, a recess 43 in the upper surface of the pointer hub 10a forms a reflecting surface 44 extending at a 45° angle to the axis of the stem 17. The forwardly propagating light impinges on this surface 44 and is reflected laterally (downwardly as viewed in FIG. 2) toward the free end of the indicator portion 10b of the pointer 10, thus illuminating the indicator portion. The rear surface 45 of the indicator portion 10b of the pointer is preferably coated with a reflective material, such as an opaque white paint, to improve the uniformity of illumination of the indicator portion and to increase the amount of light that reaches the top and side surfaces of the indicator portion.

To conceal the pointer stem 17, an opaque cap 50 fits over the front of the hub portion 10a and tail portion 10c of the pointer 10. This cap 50 is notched to fit over the indicator portion 10b that extends laterally from the hub portion 10a, so that only the indicator portion 10b is visible from the front of the gauge, even though the hub and tail portions of the pointer are also illuminated beneath the opaque cap 50. If desired, the cap 50 can be made of a translucent material to reveal the entire illuminated pointer, including the hub and tail portions 10a and 10c, with the cap serving to attenuate light from the brightest regions of the pointer and thereby make the illumination more uniform along the entire length of the pointer. The cap 50 can also be made of a color different from that of the pointer 10. A notch 51 formed in the tail side of the recess 43 reflects more light into the tail portion 10c when it is desired to illuminate that portion of the pointer.

It will be evident to those skilled in the art that the invention is not limited to the details of the foregoing illustrated embodiments and that the present invention may be embodied in other specific forms without departing from the spirit or essential attributes thereof The present embodiments are therefore to be considered in all respects as illustrative and not restrictive, the scope of the invention being indicated by the appended claims rather than by the foregoing description, and all changes, which come within the meaning and range of equivalency of the claims, are therefore intended to be embraced therein.

What is claimed is:

1. A gauge having an illuminated dial and pointer, comprising
    a light-transmitting dial plate having a front surface with indicia for a variable represented by the dial,
    at least one light source spaced rearwardly from the rear surface of said dial plate for illuminating the rear surface of said dial plate, the light from said light source being transmitted by said dial plate to the front surface thereof, and
    a light-transmitting pointer mounted for rotational movement about an axis normal to said dial plate, said pointer having a hub concentric with said axis and extending through said dial plate and projecting both forwardly and rearwardly from said plate, and an indicator projecting laterally from said hub across a portion of the front surface of said dial plate, said hub having a small-diameter portion located behind said dial plate, a large-diameter portion extending through said dial plate, and a tapered transition portion between said small-diameter and large-diameter portions, said tapered transition portion being located closer to the rear surface of said dial plate than said light source and forming a tapered outer surface for intercepting light from said light source so that said light enters said hub and propagates forwardly through said hub and laterally from said hub into said indicator for illuminating said indicator.

2. The gauge of claim 1 wherein said light source comprises multiple light-emitting diodes spaced around said axis.

3. The gauge of claim 2 wherein said light source comprises three light-emitting diodes spaced 120° from each other around said axis.

4. The gauge of claim 2 wherein said light-emitting diodes are wide-angle light-emitting diodes.

5. The gauge of claim 4 wherein each of said light-emitting diodes radiates light across an angle of about 120°.

6. The gauge of claim 1 wherein an angle formed between said axis and said tapered outer surface of said transition portion of said hub is in the range from about 20° to about 40°.

7. The gauge of claim 6 wherein the angle between said axis and said tapered outer surface of said transition portion of said hub is about 30°.

8. The gauge of claim 1 wherein a front portion of said hub forms an inclined surface for reflecting light from said hub into said indicator.

9. The gauge of claim 8 wherein said inclined surface is formed by a recess in the front of said hub, and an angle formed between said inclined surface and said axis is about 45°.

10. The gauge of claim 1 which includes an opaque cap covering a front portion of said hub.

11. A light-transmitting pointer for use in a gauge having an illuminated dial plate and a pointer drive mechanism for rotating a pointer around an axis that is normal to the dial plate, said pointer comprising a hub and an indicator projecting laterally from said hub, said hub having a large-diameter portion joined to said indicator, a small-diameter portion extending rearwardly of said large-diameter portion, and a tapered transition portion between said large-diameter and small-diameter portions, said tapered transition portion forming a tapered outer surface for intercepting light so that said light enters said hub and propagates forwardly through said hub and laterally from said hub into said indicator for illuminating said indicator.

12. The gauge of claim 11 wherein an angle formed between said axis and said tapered outer surface of said transition portion of said hub is in the range from about 20° to about 40°.

13. The gauge of claim 12 wherein the angle between said axis and said tapered outer surface of said transition portion of said hub is about 30°.

14. The gauge of claim 11 wherein a front portion of said hub forms an inclined surface for reflecting light from said hub into said indicator.

15. The gauge of claim 14 wherein said inclined surface is formed by a recess in the front portion of said hub, and an angle formed between said inclined surface and said axis is about 45°.

16. A method of illuminating the dial and pointer of a gauge having a light-transmitting dial plate having a front surface with indicia for a variable represented by the dial, and a light-transmitting pointer mounted for rotational movement about an axis normal to said dial plate, said pointer having a hub concentric with said axis and extending through said dial plate and projecting both forwardly and rearwardly from said plate, and an indicator projecting laterally from said hub across a portion of the front surface of said dial plate, said hub having a small-diameter portion located behind said dial plate, a large-diameter portion extending through said dial plate, and a tapered transition portion between said small-diameter and large-diameter portions, said tapered transition portion being located closer to the rear surface of said dial plate than at least one light source and forming a tapered outer surface said method comprising:

illuminating said dial plate with said at least one light source spaced rearwardly from the rear surface of said dial plate, capturing light directly from said light source in said tapered outer surface so that said light enters said hub and propagates forwardly through said hub, and directing light laterally into said indicator from a portion of said hub on the front side of said dial plate to illuminate said indicator.

17. The method of claim 16 wherein said light source comprises multiple light-emitting diodes spaced around said axis.

18. The method of claim 17 wherein said light source comprises three light-emitting diodes spaced 120° from each other around said axis.

19. The method of claim 17, wherein said light-emitting diodes are wide angle light-emitting diodes.

20. The method of claim 19 wherein each of said light-emitting diodes radiates light across an angle of about 120°.

21. The method of claim 16 wherein an angle formed between said axis and said tapered outer surface on said hub is in the range from about 20° to about 40°.

22. The method of claim 21 wherein the angle between said axis and said tapered outer surface of said hub is about 30°.

23. The method of claim 16 wherein a front portion of said hub forms an inclined surface for reflecting light from said hub into said indicator.

24. The method of claim 23 wherein said inclined surface is formed by a recess in the front portion of said hub, and an angle formed between said inclined surface and said axis is about 45°.

* * * * *